United States Patent
Bell et al.

(10) Patent No.: US 9,453,921 B1
(45) Date of Patent: Sep. 27, 2016

(54) DELAYED-BASED GEOGRAPHIC POSITION DATA GENERATION SYSTEM, DEVICE, AND METHOD

(71) Applicants: Douglas A. Bell, Marion, IA (US); James H. Doty, Cedar Rapids, IA (US)

(72) Inventors: Douglas A. Bell, Marion, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 400 days.

(21) Appl. No.: 14/272,633

(22) Filed: May 8, 2014

(51) Int. Cl.
*G01S 19/49* (2010.01)
*G01S 19/38* (2010.01)

(52) U.S. Cl.
CPC ...................................... *G01S 19/49* (2013.01)

(58) Field of Classification Search
USPC .............. 342/357.21, 357.25, 357.4, 357.32; 701/468, 469
See application file for complete search history.

(56) References Cited

U.S. PATENT DOCUMENTS

| 6,389,354 B1 | 5/2002 | Hicks et al. |
| 8,321,074 B1 | 11/2012 | Bell et al. |
| 8,498,758 B1 | 7/2013 | Bell et al. |

*Primary Examiner* — Dao Phan
(74) *Attorney, Agent, or Firm* — Daniel M. Barbieri; Donna P. Suchy; Angel N. Gerdzhikov (57) ABSTRACT

Present novel and non-trivial system, device, and method for generating geographic position are disclosed. A processor receives navigation data representative of geographic position from an external source such as a global positioning system ("GPS"); receives navigation data representative of measurements of angular and linear motions from an internal source of navigation data such as an inertial measurement unit ("IMU"); and determines and generates navigation data representative of geographic position responsive to such determination. The generation of navigation data could be based upon internal source navigation data and an estimate of error of geographic position, where the estimate of error is based upon a delay of the external-sourced navigation data and a delayed output from one of the internal sources (e.g., delayed output of an IMU).

22 Claims, 5 Drawing Sheets

DELAYED-BASED GEOGRAPHIC POSITION DATA GENERATION SYSTEM, DEVICE, AND METHOD

BACKGROUND OF THE INVENTION

1. Field of the Invention

This invention pertains generally to the field of navigation systems such as, but not limited to, aircraft navigation systems.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") published by the United States ("U.S.") Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation."

A low-visibility instrument approach procedure ("IAP") that permits a pilot to operate to a lower altitude than permitted by a standard Instrument Landing System ("ILS") (which is generally 200 feet height above threshold ("HATh")) without visually identifying the runway environment may require the use of a radio altimeter system to define a missed approach point represented to the pilot as a decision height ("DH").

In determining the DH, an aviation-governing authority such as the FAA surveys the approach corridor to the runway to determine the DH relative to the runway. In order to achieve lower minima (i.e., lower DH) for IAPs based upon a satellite navigation system such as the Global Positioning System ("GPS"), preparations have begun in the U.S. to implement the Next Generation Air Transport System ("NextGen"), a system designed to reduce the stress currently experienced by the U.S and address the expected growth in aircraft operations forecasted through 2025. At the time of this writing, the lowest minima for GPS-based approaches such as the Localizer Performance with Vertical Guidance ("LPV") include a DH of 200 feet HATh.

At the current 200 feet DH, a six second time to alert for errors in GPS navigation is adequate, however, as the DH is reduced the time to alert must be reduced as the time available to recover from a navigation error is reduced as the aircraft altitude is reduced. In addition, for RNP of less than 0.3 nautical miles, the aircraft navigation system must be able to maintain accurate navigation for some time period to allow the aircraft to climb to a safe altitude clear of terrain. The aircraft must be equipped to continue to accurately navigate after a loss or detected error in GPS and any detected fault in GPS must not degrade the navigation system's ability to continue to provide position information after the GPS fault.

RNP may include performance and functional requirements indicated by the RNP type. The RNP type defines the total system error ("TSE") that may be allowed in lateral and longitudinal dimensions within a particular airspace, where the TSE takes into account path definition errors ("PDE"), navigation system errors ("NSE"), and flight technical errors ("FTE"). The RNP type is used to specify navigation requirements for the airspace or a navigation system that provides a specified level of accuracy defined by a lateral area of confined airspace in which an RNP-certified aircraft operates. For example, an RNP 0.3 level requires a normal navigational accuracy of 0.3 nautical miles ("NM") at least 95 percent of the total flight time; similarly, an RNP 0.1 level requires a normal navigational accuracy of 0.1 NM at least 95 percent of the total flight time. Hence, a lower level of RNP means a greater level of navigational accuracy. With the availability of GPS, future airspace systems may rely heavily on GPS-based navigation to which stringent standards for NSE may be applied. An IAP specifying an RNP level of less than RNP 0.3 or lower than the standard minima at airports not equipped with an ILS may require a method to detect GPS position errors before the 6.2 second time-to-alert standard that currently exists for systems utilizing satellite based augmentation systems such as Wide Area Augmentation System ("WAAS") or even the shorter 3 second time to alert for typical ground based augmentation systems.

Undetected errors in the data from GPS or other external navigation signal sources may persist during the period between the time of the external navigation signal source in space fault occurrence and the time at which the navigation system is made aware of the fault by the external navigation aids (pre-detection fault period). In addition, a system may be required to maintain precise navigation for some time after loss of GPS or other external navigational signal source. An aircraft navigation system may utilize the external navigation signal source to help it correct errors in its inertial system, such as inertial sensor biases or velocity errors in its strapdown navigation solution. In this case, if data from the external navigation signal source is used during the pre-detection fault period, it may make erroneous estimates of the inertial system errors. Any erroneous estimates of the inertial system errors could, in turn, cause the navigation system errors to continue to increase at a significant rate even after the navigation system has stopped using the erroneous data from the external navigation signal source.

BRIEF SUMMARY OF THE INVENTION

The embodiments disclosed herein present novel and non-trivial system, device, and method for generating geographic position data for use onboard an aircraft during an approach-for-landing phase of flight. The embodiments disclosed herein could ensure that erroneous data from an external navigation signal source such as GPS is not utilized during a pre-detection fault period. By avoiding the use of any erroneous data from the external navigation signal source during the pre-detection fault period, errors in the position and other output parameters of the navigation system may be avoided both during the pre-detection fault period and after the fault has been detected. With the embodiments disclosed herein, data from ground-based augmentation system ("GBAS") aided satellite navigation system, an inertial measurement unit ("IMU"), and an air-data system ("ADS") may be employed to generate geographic position data.

In one embodiment, a system for generating geographic position data is disclosed. The system may be comprised of an external source of navigation data (e.g., satellite navigation system), an internal sources of navigation data (e.g., IMU), and a processor for generating geographic position data. In an additional embodiment, a second internal source of navigation (e.g., "ADS") could be employed.

In another embodiment, a device such as the processor for generating geographic position data is disclosed. This device may be configured to generate geographic position data based upon the input from the external source and one or more internal sources of navigation data. The geographic position data that is generated could be representative of an instant measurement of geographic position such as latitude and longitude.

In another embodiment, a method for generating geographic position data is disclosed, where the method could be performed by the processor. When properly configured, the processor may receive the navigation data representative of geographic position from the external source, receive navigation data representative of measurements of angular and linear motions from an internal source, and generate navigation data representative of geographic position based upon internal source navigation data and an estimate of error of geographic position, where the estimate of error is based upon a delay of the external-sourced navigation data and a delayed output from one of the internal sources (e.g., delayed strapdown output of a strapdown position measurement).

BRIEF DESCRIPTION OF THE DRAWINGS

The drawings of FIG. 1 depict a functional block diagram of a system for generating navigation data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
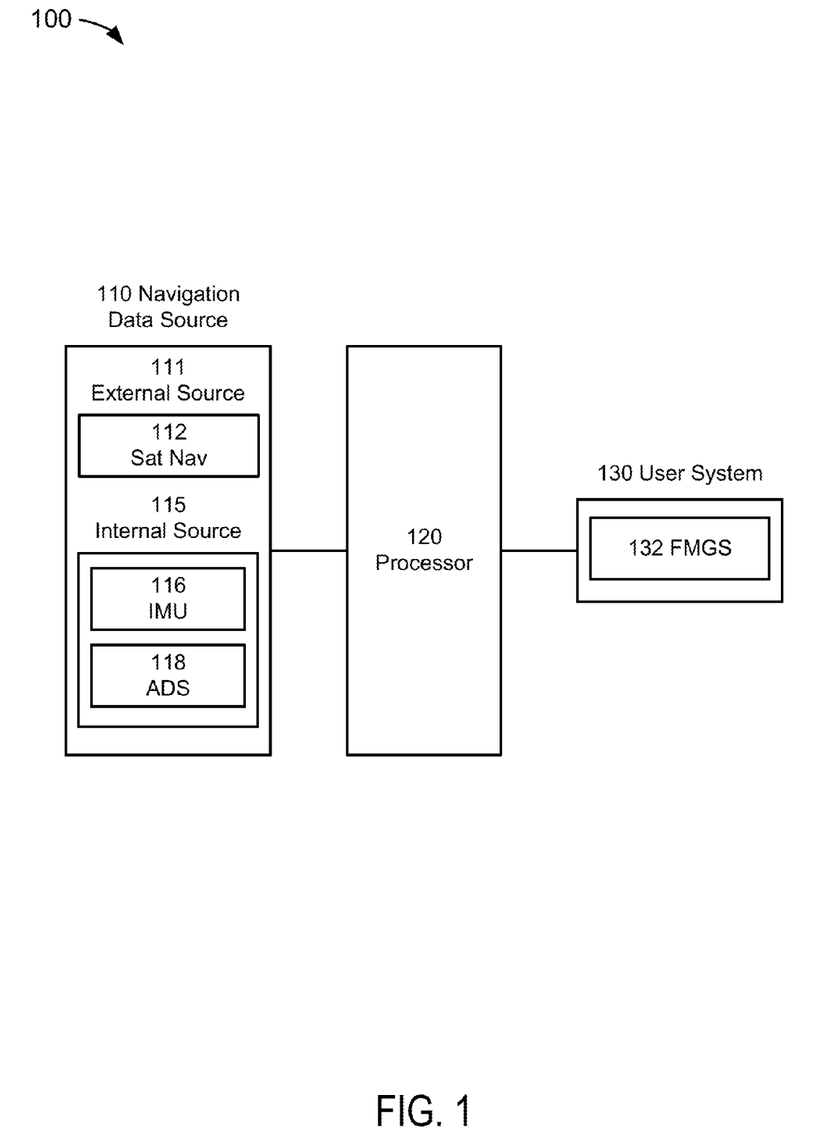

FIG. 1 depicts a functional block diagram of a geographic position data generation system 100 suitable for implementation of the techniques described herein. The functional blocks of the system may include a navigation data source 110, a processor 120, and a user system 130.

In an embodiment of FIG. 1, the navigation data source 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

The navigation data source 110 could be comprised of, but not limited to, an external source 111 and/or an internal source 115. The external source 111 may refer to a data source which acquires raw data from a source external to the aircraft, and the internal source 115 may refer to a data source which acquires raw data from a source internal to the aircraft. For both types of sources, the raw data could be data from which navigation data may be determined.

An example of an externally-sourced navigation data source 111 is a satellite navigation system ("Sat Nav") 112. From the external source 111, navigation data such as aircraft position data comprised of geographic position (e.g., latitude and longitude coordinates) data and altitude data may be determined and provided as output. In addition, data representative of the quality of the navigation data may be provided by the navigation data source 110, where such data may include parameters associated with, but not limited to, accuracy, resolution, integrity, uncertainty, and/or validity. Those skilled in the art understand that quality of navigation data could depend on the system providing the data, e.g., the satellite navigation system (e.g., global positioning system ("GPS")), an air/data system ("ADS"), an inertial measurement unit ("IMU") of an inertial navigation system ("INS"), and a flight management computing system. Furthermore, the quality of navigation data provided by a system could depend on other considerations.

The quality of navigation data provided by the Sat Nav 112 could depend on other considerations such as whether an augmentation system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FAA may deliver better quality of data than a WAAS by providing extremely high parameters of accuracy, availability, and integrity; for example, the LAAS has demonstrated an accuracy of less than 1 meter in both the horizontal and vertical axes.

GBAS monitors satellites and provides correction messages to users in the vicinity of the GBAS station. The monitoring enables the GBAS to detect anomalous GPS satellite behavior and alert users in a time frame appropriate for aviation uses. The GBAS provides corrections to the GPS signals with a resulting improvement in accuracy sufficient to support aircraft precision approach operations.

At the time of this writing, GBAS standards support the operations of Category I Approaches meeting Category I minima; these GBAS systems are identified as GBAS Approach Service Type C ("GAST-C") and achieve accuracy of 16 meters laterally and 4 meters vertically. A GBAS Approach Service Type D ("GAST-D") system could support the operations of Category III Precision Approaches meeting Category-III minima; the GAST-D GBAS may allow aircraft to land with zero visibility using autoland systems. RCTA has published the GBAS standards in DO-245A entitled "Minimum Aviation System Performance Standards for Local Area Augmentation System."

Examples of an internally-sourced navigation data source 115 could include, but not be limited to, an IMU 116 and ADS 118. The IMU 116 could be representative of any system in which navigation data is derived from inertial sensors such as accelerometers for measuring motion on the axes of an aircraft and/or gyroscopes (singularly, "gyro") for measuring rotation about the axes. Known to those skilled in the art and depending on the specific configuration, the IMU 116 could be comprised of accelerometers, gyros, a navigation computer, and a clock. Accelerometers could sense linear change in rate or motion (i.e., acceleration) along an aircraft axis (e.g., roll, pitch, and yaw), and gyroscopes may sense angular rates in change of orientation (e.g., rotation rate about the roll, pitch, and yaw axes).

The INS may be generally categorized into one of two types: gimbaled and strapdown. The differences between the two may be based upon the type of inertial system or IMU 116 being used. In a gimbaled INS, the IMU 116 consists of a set of mutually orthogonal accelerometers attached to a gimbaled gyro platform and held in a fixed orientation in inertial space. In the event of aircraft angular motion, the gyros are used to maintain the orientation of the inertial platform containing the accelerometers to maintain their original orientation in inertia space. Angular "pickoffs" on the gimbals may be used to measure the relative angles between aircraft frame and the inertially stabilized platform. Because the inertial platform inside the gimbals is held in a fixed orientation relative to inertial space, the accelerometers may be directly used to measure the body's acceleration in the fixed inertial axes.

In a strapdown INS, the gyroscopes and the accelerometers are mechanically fixed with respect to the vehicle body. They measure the linear and angular motion of the vehicle relative to inertial space. The motion is expressed in vehicle coordinates. Therefore, in a strapdown INS, it is necessary to first compute the altitude of the vehicle relative to the reference navigation frame. Then, the computed attitude is used to transform the accelerometer measurements into the reference navigation frame. After the accelerometer data of a strapdown INS has been rotated into the reference frame, the solution of the navigation equations mentioned previously is identical in both the gimbaled IMU and the strapdown IMU.

In the strapdown INS, the altitude computations, which are required to resolve accelerometer measurements, are usually carried out at a high rate. The computations suffer from numerical errors because of the limited computer byte size and throughput availability. These computation errors depend on the frequency response of the sensor loop, data rate, and resolution and magnitude of the sensor output at the sampling time.

However, significant benefits arise from using the strapdown INS, rather than the gimbaled INS. The strapdown INS is generally less costly. Moreover, the strapdown INS is generally smaller in physical size. Thus, the potential to realize size and cost savings may make strapdown INS attractive for both military and commercial applications.

The performance of an INS is primarily limited by errors contributed by the various constituent sensors within the INS. Gyroscopes drift, and accelerometers have inherent biases. Furthermore, errors may be contributed from improper scale factors and improper INS alignment angles. Typically, the preceding errors cause inaccuracies in the estimates of vehicle positions, velocity, and altitude, which accumulate over time as a vehicle mission progresses. To some extent, the errors are dependent on user dynamics.

The ADS 118 could be representative of any system in which navigation data is derived from an aircraft's pitot-static system and the sensors thereof. Known to those skilled in the art, the ADS 118 could provide output data representative of barometric altitude, corrected barometric altitude, altitude trend, computed airspeed, true airspeed, mach number, static air temperature, and/or total air temperature. As embodied herein, the navigation data source 110 could provide navigation data to the processor 120 for subsequent processing as discussed in detail below.

As discussed above, the quality of navigation data provided by the navigation data source 110 may depend upon one or more quality parameters such as, but not limited to, accuracy, resolution, integrity, uncertainty, and/or validity. Due to the quality of navigation data, there could be a difference between the geographic position information provided by the Sat Nav 112 and the actual geographic position of the aircraft. For example, aircraft altitude information provided by the Sat Nav 112 may agree with the actual altitude of the aircraft but the geographic position information provided by the Sat Nav 112 may not agree with aircraft geographic position because of poor quality of altitude data.

In an embodiment of FIG. 1, the processor 120 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 120 may be driven by the execution of software or computer instruction code containing algorithms developed for the specific functions embodied herein. The processor 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 120 could be a processor(s) used by or in conjunction with any other system of the aircraft including, but not limited to, the navigation data source 110 and/or the user system 130.

The processor 120 may be programmed or configured to receive as input data representative of information obtained from various systems and/or sources including, but not limited to, the navigation data source 110. As embodied herein, the terms "programmed" and "configured" are synonymous. The processor 120 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 120 may be programmed or configured to execute one or both of the methods discussed in detail below. The processor 120 may be programmed or configured to provide output data to various systems and/or units including, but not limited to, the user system 130.

In an embodiment of FIG. 1, the user system 130 could be comprised of any system that may use instant geographic position data. An example of the user system 130 could be, but are not limited to, a flight management and guidance system ("FMGS") 132 which includes a flight management system ("FMS"). The user system 130 could also include the navigation data source 110.

In an embodiment of FIG. 1, the FMGS 132 may be any system that provides one or more of the following functions: autopilot, flight direction, auto throttle, and/or flight management. One of the functions that could be performed by the FMGS 132 could include the automated operation of the aircraft during an instrument approach procedure ("IAP") to a runway of intended landing. As part of the procedure, the aircraft may reach a decision height (a known value of height above the runway's landing threshold point) at which time the pilot may be required to make a decision to continue the approach to landing or begin a "missed approach" procedure. The FMGS 132 is known to those skilled in the art.

Figure 2:
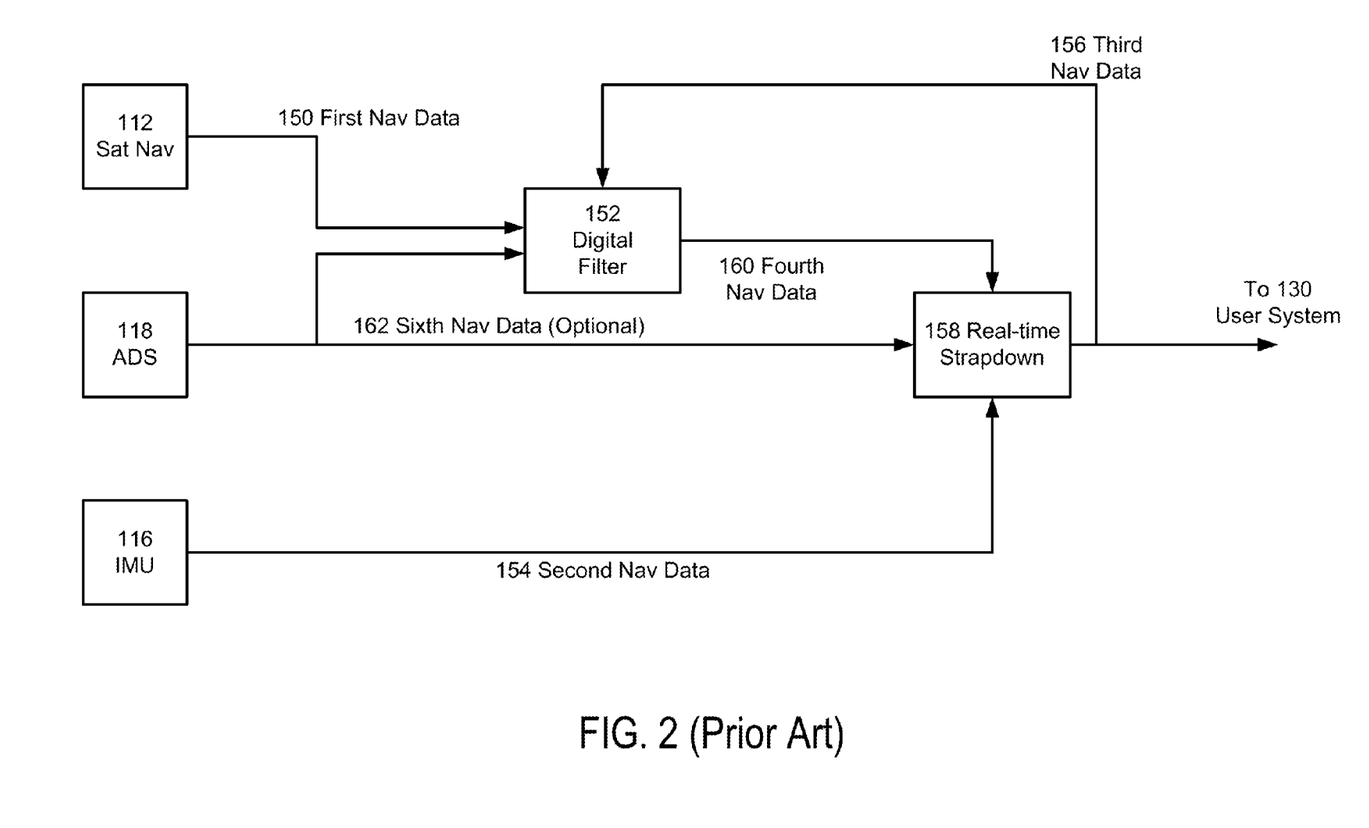
FIG. 2 depicts a data flow diagram of a prior art.

Referring to FIG. 2, a data flow diagram of exemplary prior art is illustrated. First navigation data 150 may be received and subjected to a digital filter 152, where the first navigation data 150 may be comprised of externally-sourced navigation data provided by an external source (e.g., Sat Nav 112). The first navigation data 150 may be representative of a first measurement of at least aircraft geographic position.

Second navigation data 154 may be received, where the second navigation data 154 may be comprised of internally-sourced navigation data provided by a first internal source (e.g., IMU 116). The second navigation data 154 may be representative of measurements of angular motions (e.g., rotaton rates about the roll, pitch, and yaw axes) and linear motions (e.g., acceleration motions along the three axes of the aircraft).

Third navigation data 156 may be determined and generated as the result of a real-time strapdown 158, where the third navigation data 156 may be representative of a second measurement of at least aircraft geographic position. The second measurement could be comprised of an estimate of geographic position. In one embodiment, the third navigation data 156 may be provided to one or more systems of the user system 130.

The third navigation data 156 could be determined as a function of both second navigation data 154 and fourth navigation data 160, where the fourth navigation data 160 could be representative of an estimate of error of at least geographic position. The fourth navigation data 160 could be determined and generated as a function of both first navigation data 150 and previously-generated third navigation data 156. As embodied herein, the determining and generating of the fourth navigation data 160 could be performed by a digital filter 152. An example of the digital filter 152 is a Kalman filter, a filter known to those skilled in the art.

In one prior art implementation of digital filter 152, fourth navigation data 160 is provided to correct errors in the real-time strapdown 158 whenever the first navigation data 150 is available and flagged as valid; otherwise, the fourth navigation data 160 may not provided. If first navigation data 150 includes undetected errors, the fourth navigation data 160 may develop errors causing the third navigation data 156 produced by the real-time strapdown 158 to begin moving away from a correct geographical position. This erroneous movement in the third navigation data 156 may persist after the fault in the first navigation data 150 has been detected; if so, the fourth navigation data 160 may be discontinued.

In an optional prior art embodiment, there could be a receiving of sixth navigation data 162 (the term "fifth navigation data" is not used in FIG. 2), where the sixth navigation data 162 may be comprised of internally-sourced navigation data provided by a second internal source (e.g., ADS 118). The sixth navigation data 162 may be representative of a third measurement of at least aircraft geographic position.

The function for determining and generating of the third navigation data 156 could include the sixth navigation data 162. The function for determining of the fourth navigation data 160 could include the sixth navigation data 162. In a separate embodiment, the receiving of the first navigation data 150 could be excluded, essentially substituting the first navigation data 150 with sixth navigation data 162.

Figure 3:
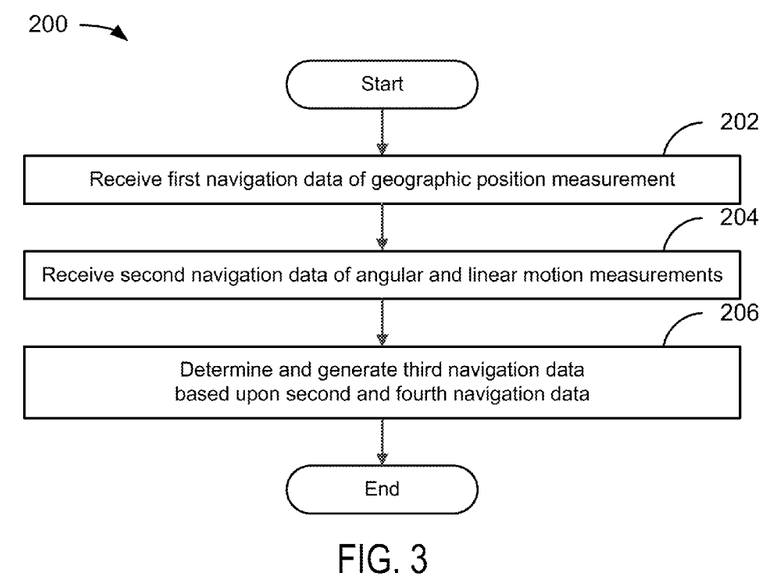
FIG. 3 depicts a flowchart of a first method for generating navigation data.
Figure 5:
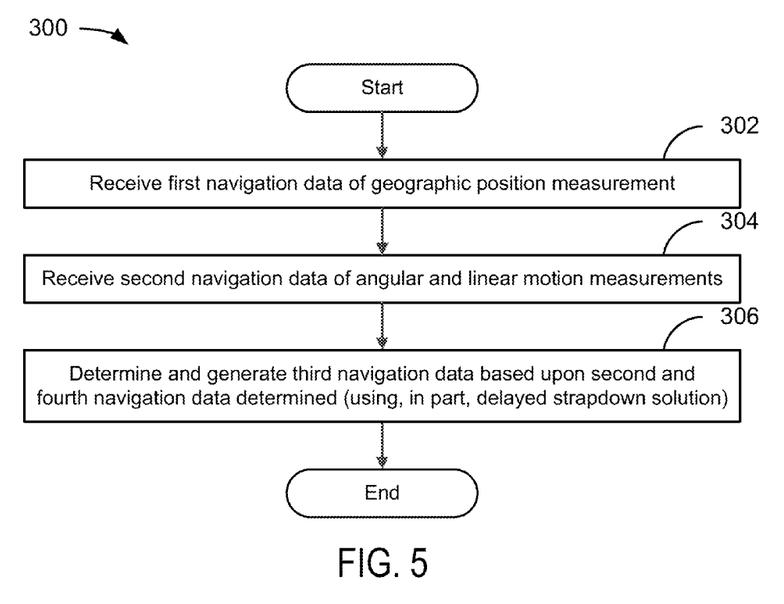
FIG. 5 depicts a flowchart of a second method for generating navigation data

Referring to FIGS. 3 and 5, flowcharts 200 and 300 disclose examples of methods for generating navigation data, where the processor 120 may be programmed or configured with instructions corresponding to the following modules embodied in the flowcharts. As embodied herein, the processor 120 may be a processor or a combination of processors found in a source(s) of the navigation data source 110 and/or the user system 130. Also, the processor 120 may be a processor of a module such as, but not limited to, a printed circuit card having one or more input interfaces to facilitate the two-way data communications of the processor 120, i.e., the receiving and providing of data. As necessary for the accomplishment of the following modules embodied flowcharts 200 and 300, the receiving of data is synonymous and/or interchangeable with the retrieving of data, and the providing of data is synonymous and/or interchangeable with the making available or supplying of data.

Figure 4:
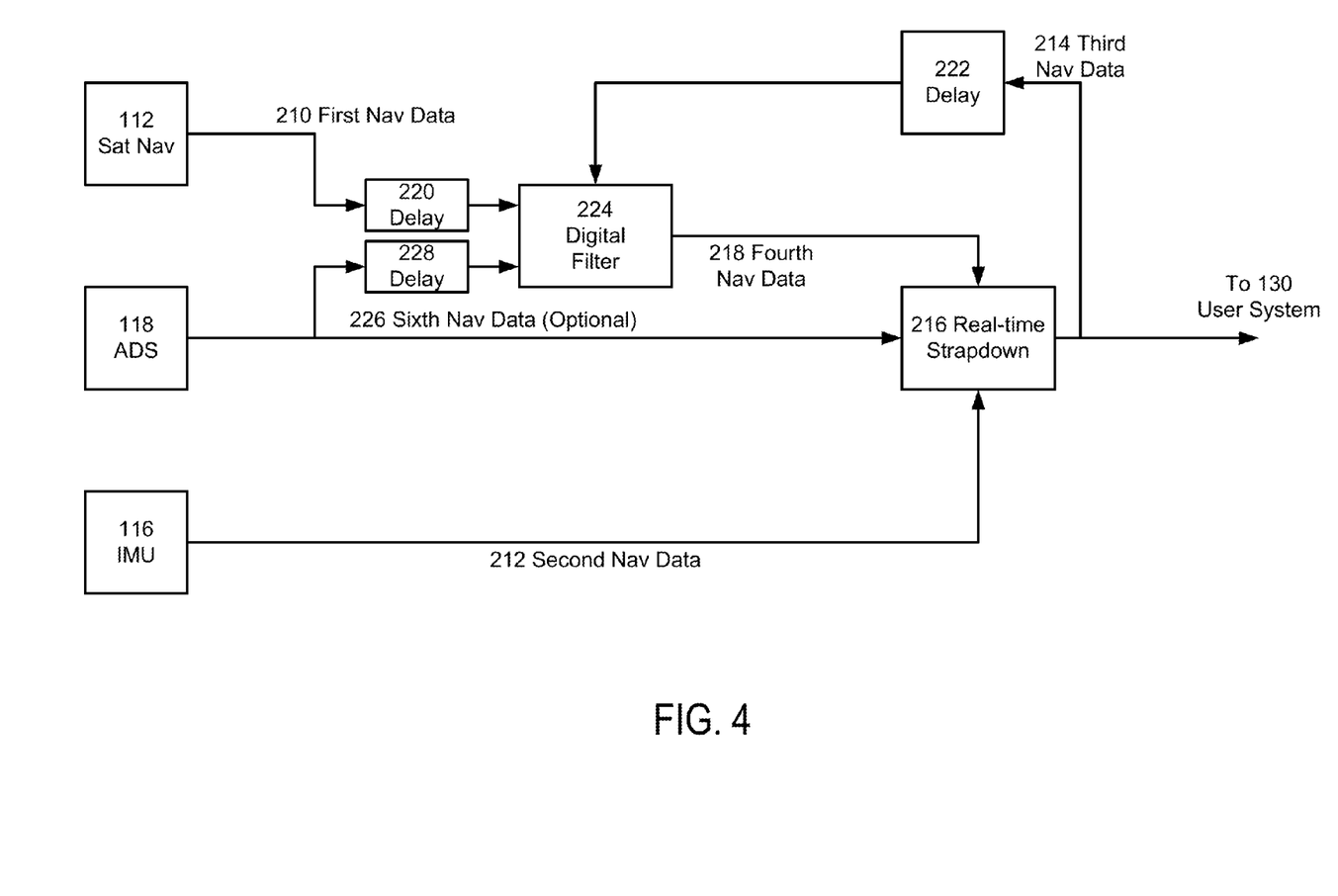
FIG. 4 depicts a data flow diagram of the method shown in FIG. 3

As shown in FIGS. 3 and 4, the flowchart 200 and a respective data flow diagram are depicted, respectively. The flowchart begins with module 202 with the receiving of first navigation data 210, where the first navigation data 210 may be comprised of navigation data provided by an external source (e.g., Sat Nav 112). The first navigation data 210 may be representative of a first measurement of at least aircraft geographic position.

The flowchart continues with module 204 with the receiving of second navigation data 212, where the second navigation data 212 may be comprised of navigation data provided by a first internal source (e.g., IMU 116). The second navigation data 212 may be representative of measurements of angular motions (e.g., rotation rates about the roll, pitch, and yaw axes) and linear motions (e.g., acceleration motions along the three axes of the aircraft).

The flowchart continues with module 206 with the determining and generating of third navigation data 214 as the result of a real-time strapdown 216, where the third navigation data 214 may be representative of a second measurement of at least aircraft geographic position. The second measurement could be comprised of an estimate of geographic position. In one embodiment, the third navigation data 214 may be provided to one or more systems of the user system 130.

The third navigation data 214 could be determined as a function of both second navigation data 212 and fourth navigation data 218, where the fourth navigation data 218 could be representative of an estimate of error of at least geographic position. The fourth navigation data 218 could be determined and generated as a function of both first navigation data 210 subjected to a delay 220 and previously-generated third navigation data 214, that is, third navigation data 214 subjected to a delay 222. As embodied herein, the determining and generating of the fourth navigation data 218 could be performed by a digital filter 224. An example of the digital filter 224 is a Kalman filter, a filter known to those skilled in the art.

In an optional embodiment, there could be a receiving of sixth navigation data 226 (the term "fifth navigation data" is not used in FIG. 4), where the sixth navigation data 226 may be comprised of navigation data provided by a second internal source (e.g., ADS 118). The sixth navigation data 226 may be representative of a third measurement of at least aircraft geographic position.

The function for determining and generating of the third navigation data 214 could include the sixth navigation data 226. The function for determining of the fourth navigation data 218 could include the sixth navigation data 226 subjected to a delay 228. In a separate embodiment, the receiving of the first navigation data 210 could be excluded, resulting with the exclusion of the delayed first navigation data outputted from the delay 220 from the function for determining the fourth navigation data 218. Then, the flowchart 200 proceeds to the end.

Figure 6:
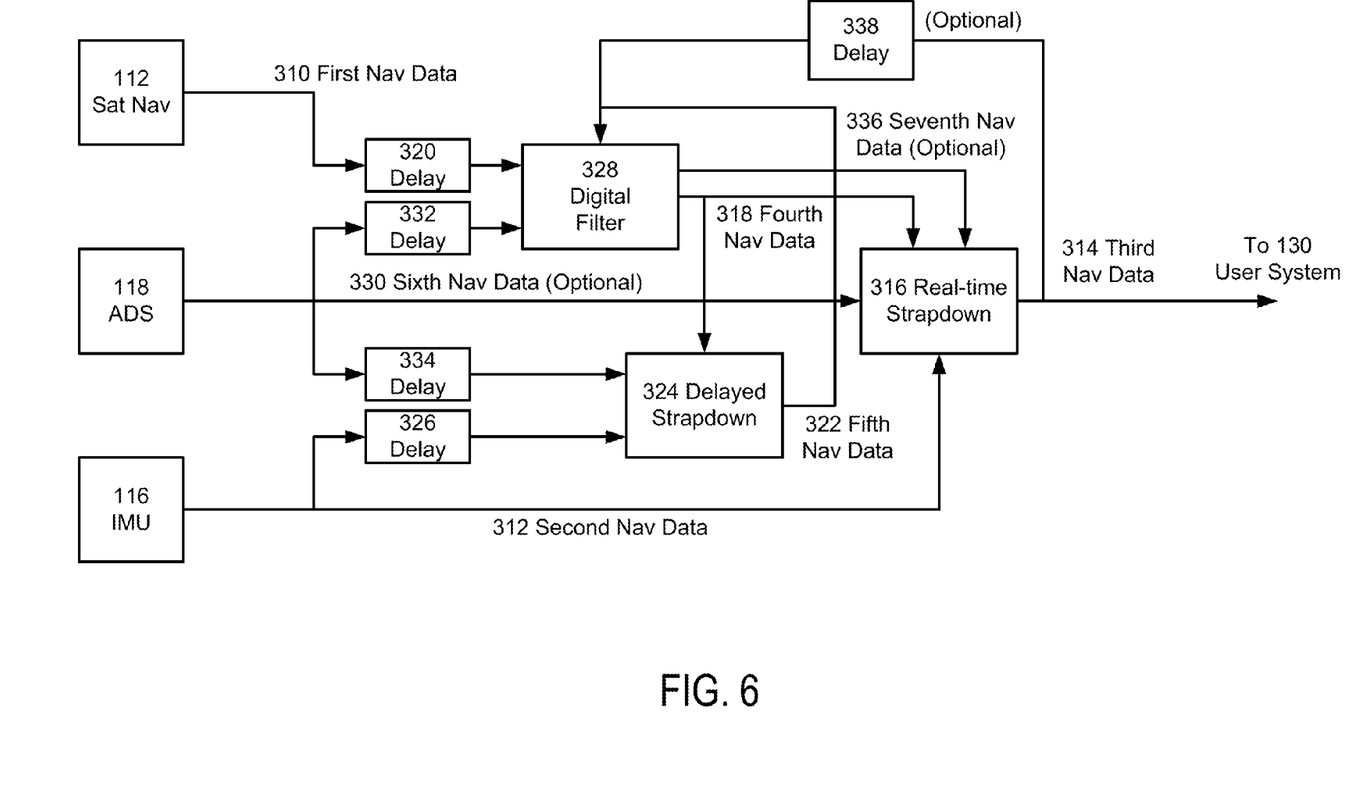
FIG. 6 depicts a data flow diagram of the method shown in FIG. 5.

As shown in FIGS. 5 and 6, the flowchart 300 and a data flow diagram are depicted, respectively. The flowchart begins with module 302 with the receiving of first navigation data 310, where the first navigation data 310 may be comprised of navigation data provided by an external source (e.g., Sat Nav 112). The first navigation data 310 may be representative of a first measurement of at least aircraft geographic position.

The flowchart continues with module 304 with the receiving of second navigation data 312, where the second navigation data 312 may be comprised of navigation data provided by a first internal source (e.g., IMU 116). The second navigation data 312 may be representative of measurements of angular motions (e.g., rotation rate about the roll, pitch, and yaw axes) and linear motions (e.g., acceleration motions along the three axes of the aircraft).

The flowchart continues with module 306 with the determining and generating of third navigation data 314 as the result of a real-time strapdown 316, where the third navigation data 314 may be representative of a second measurement of at least aircraft geographic position. The second measurement could be comprised of an estimate of geographic position. In one embodiment, the third navigation data 314 may be provided to one or more systems of the user system 130.

The third navigation data 314 could be determined as a function of both second navigation data 312 and fourth navigation data 318, where the fourth navigation data 318 could be representative of an estimate of error of at least geographic position. The fourth navigation data 318 could be determined and generated as a function of both first navigation data 310 subjected to a delay 320 and fifth navigation data 322. The fifth navigation data 322 may be the result of a delayed strapdown 324, where the fifth navigation data 322 may be determined as a function of second navigation data 312 subjected to a delay 326 and previously-generated fourth navigation data 318. As embodied herein, the determining and generating of the fourth navigation data 318 could be performed by a digital filter 328 such as, but not limited to, a Kalman filter.

It should be noted that, although the embodiment in shown in FIG. 6 is more complex than that shown in FIG. 4, it could have the advantage of improved stability allowing it to be used with an IMU 116 having a greater level of error and instability. The use of the delayed strapdown 324 with the digital filter 328 could ensure that these two systems operate in the same time frame ensuring the same level of stability shown in non-delay systems such as the system shown in FIG. 2. To provide for a non-delay real time solution, a separate real-time strapdown 316 is provided in FIG. 6 that operates using the corrections in the fourth navigation data 318 generated to correct the delayed strapdown 324 errors.

In two optional embodiments, there could be a receiving of sixth navigation data 330, where the sixth navigation data 330 may be comprised of navigation data provided by a second internal source (e.g., ADS 118). The sixth navigation data 330 may be representative of a third measurement of at least aircraft geographic position.

The function for determining and generating of the third navigation data 314 could include the sixth navigation data 330. The function for determining and generating of the fourth navigation data 318 could include the sixth navigation data 330 subjected to a delay 332. In addition, the delayed strapdown 324 could include the sixth navigation data 330 subject to a delay 332. In a separate embodiment, the receiving of the first navigation data 310 could be excluded, resulting with the exclusion of the delayed first navigating data outputted from the delay 320 from the function for determining the fourth navigation data 318.

The fourth navigation data 318 could correct major errors in the real-time strapdown 316 leaving a slow residual drift in position error. In a second optional embodiment, the function for determining the third navigation data 314 could include seventh navigation data 336 to correct for the residual drift in position error, where the seventh navigation data 336 could be representative of a difference between estimates of error of at least geographic position. The seventh navigation data 336 could be determined as a function of the first navigation data 310 subjected to a delay 320 and either the fifth navigation data 322, the third navigation data 314 subjected to a delay 338, or both. Then, the flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating geographic position data, such system comprising:

a plurality of sources of navigation data; and a processor configured to receive first navigation data representative of a first measurement of at least geographic position, receive second navigation data representative of measurements of angular and linear motions, and determine and generate third navigation data representative of a second measurement of at least geographic position as a first function of the second navigation, and
fourth navigation data representative of an estimate of error of at least a measurement of geographic position determined and generated as a second function of
a delay of the first navigation data, and
either fifth navigation data or a delay of previously-generated third navigation data.

2. The system of claim 1, wherein
the first navigation data is externally-sourced navigation data, and
the second navigation data is first internally-sourced navigation data.

3. The system of claim 1, wherein
the first navigation data is comprised of sixth navigation data, where
the sixth navigation data is first internally-sourced navigation data, and
the second navigation data is second internally-sourced navigation data, where
the first function includes the sixth navigation data.

4. The system of claim 1, wherein
the processor is further configured to
receive sixth navigation data representative of a third measurement of at least geographic position, where
the first function includes the sixth navigation data, and
the second function includes a delay of the sixth navigation data.

5. The system of claim 1, wherein
the fifth navigation data is determined as a third function of
a delay of the second data, and
previously-generated fourth navigation data.

6. The system of claim 5, wherein
the first navigation data is comprised of first internally-sourced navigation data, and
the second navigation data is comprised of second internally-sourced navigation data, where
the first function includes the first navigation data, and
the third function includes a delay of the sixth navigation data.

7. The system of claim 5, wherein
the processor is further configured to
receive sixth navigation data representative of a third measurement of at least geographic position, where
the first function includes the sixth navigation data,
the second function includes a delay of the sixth navigation data, and
the third function includes a delay of the sixth navigation data.

8. The system of claim 5, wherein
the first function includes seventh navigation data representative of a difference between estimates of error, where
the second function further determines and generates the seventh navigation data.

9. A device for generating geographic position data, such device comprising:
a processor configured to
receive first navigation data representative of a first measurement of at least geographic position;
receive second navigation data representative of measurements of angular and linear motions; and
determine and generate third navigation data representative of a second measurement of at least geographic position as a first function of
the second navigation data, and
fourth navigation data representative of an estimate of error of at least a measurement of geographic position determined and generated as a second function of
a delay of the first navigation data, and
either fifth navigation data or a delay of previously-generated third navigation data.

10. The device of claim 9, wherein the first function includes the first navigation data comprised of sixth navigation data.

11. The device of claim 9, wherein
the processor is further configured to
receive sixth navigation data representative of a third measurement of at least geographic position, where
the first function includes the sixth navigation data, and
the second function includes a delay of the sixth navigation data.

12. The device of claim 9, wherein
the fifth navigation data is determined as a third function of
a delay of the second data, and
previously-generated fourth navigation data.

13. The device of claim 12, wherein
the first function includes the first navigation data, and
the third function includes a delay of the sixth navigation data.

14. The device of claim 12, wherein
the processor is further configured to
receive sixth navigation data representative of a third measurement of at least geographic position, where
the first function includes the sixth navigation data,
the second function includes a delay of the sixth navigation data, and
the third function includes a delay of the sixth navigation data.

15. The device of claim 12, wherein
the first function includes seventh navigation data representative of a difference between estimates of error, where
the second function further determines and generates the seventh navigation data.

16. A method for generating geographic position data, such method comprising:
receiving first navigation data representative of a first measurement of at least geographic position from a first source of navigation data;
receiving second navigation data representative of measurements of angular and linear motions from a second source of navigation data; and
determining and generating third navigation data representative of a second measurement of at least geographic position as a first function of
the second navigation data, and
fourth navigation data representative of an estimate of error of at least a measurement of geographic position determined and generated as a second function of
a delay of the first navigation data, and
either fifth navigation data or a delay of previously-generated third navigation data.

17. The method of claim 16, wherein the first function includes the first navigation data comprised of sixth navigation data.

18. The method of claim 16, further comprising:
receiving sixth navigation data representative of a third measurement of at least geographic position, where
the first function includes the sixth navigation data, and
the second function includes a delay of the sixth navigation data.
19. The method of claim 16, wherein
the fifth navigation data is determined as a third function of
a delay of the second data, and
previously-generated fourth navigation data.
20. The method of claim 19, wherein
the first function includes the first navigation data, and
the third function includes a delay of the sixth navigation data.
21. The method of claim 19, further comprising:
receiving sixth navigation data representative of a third measurement of at least geographic position, where
the first function includes the sixth navigation data,
the second function includes a delay of the sixth navigation data, and
the third function includes a delay of the sixth navigation data.
22. The method of claim 19, wherein
the first function includes seventh navigation data representative of a difference between estimates of error, where
the second function further determines and generates the seventh navigation data.

* * * * *